D. W. BOVEE.
HARROW DISK.
APPLICATION FILED DEC. 19, 1911.
1,081,886.
Patented Dec. 16, 1913.
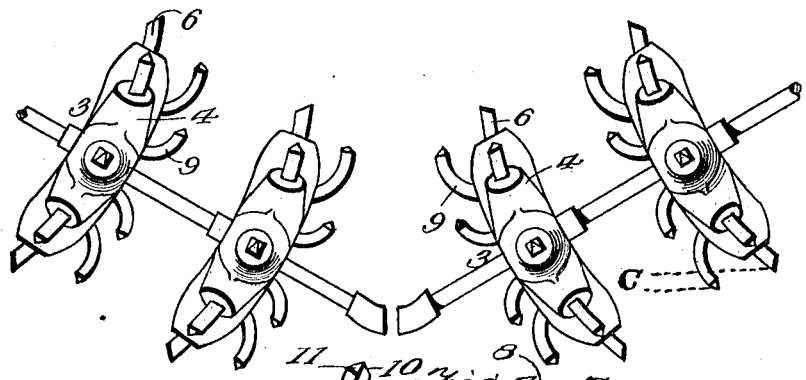
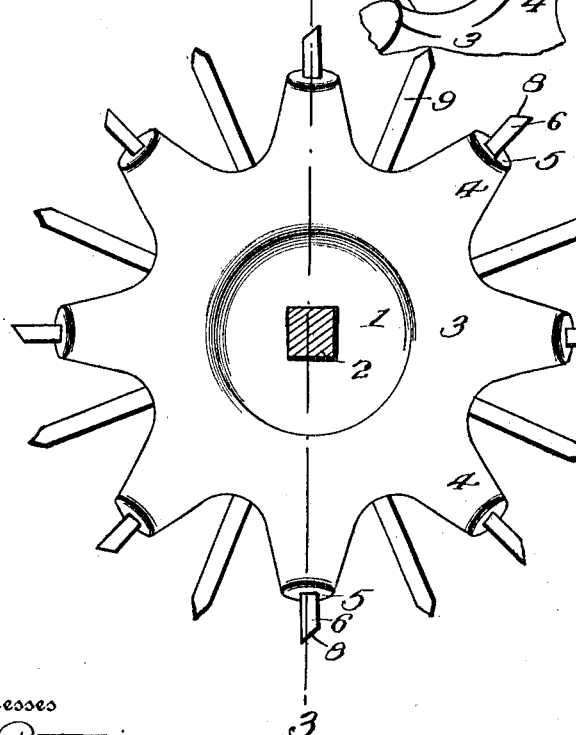
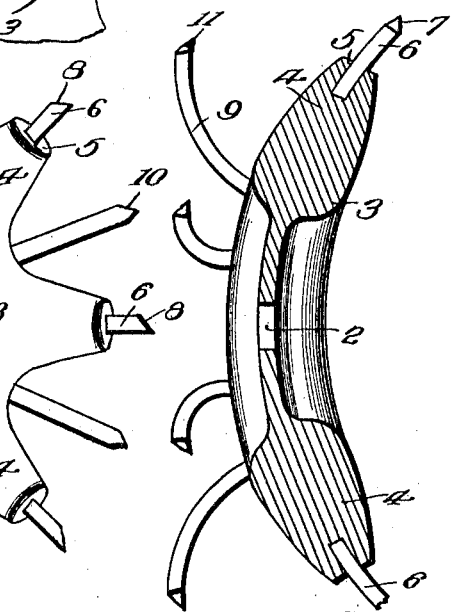
Witnesses
H. A. Pattison.
C. P. Wright Jr.
Inventor
D. W. Bovee,
By A. J. Pattison.
Attorney

UNITED STATES PATENT OFFICE.

DAVID W. BOVEE, OF WATERLOO, IOWA.

HARROW-DISK.

1,081,886. Specification of Letters Patent. Patented Dec. 16, 1913.

Application filed December 19, 1911. Serial No. 666,693.

*To all whom it may concern:*

Be it known that I, DAVID W. BOVEE, a citizen of the United States, residing at Waterloo, in the county of Blackhawk and State of Iowa, have invented certain new and useful Improvements in Harrow-Disks, of which the following is a specification, reference being had therein to the accompanying drawings.

My invention relates to improvements in harrow disks.

The object of my invention is to provide a harrow disk which is more particularly designed for cultivating wheat or other small grain, without pulling out or destroying the growing grain, and at the same time so constructing the teeth that they will readily penetrate the hard ground.

Another object of my invention is to provide auxiliary teeth between the main teeth for drawing the loose soil into the furrow made by the cultivating teeth.

Another object of my invention is to provide a simple, cheap and effective disk of this character having certain details of structure hereinafter fully set forth.

In the accompanying drawing:—Figure 1 is a diagrammatic view, showing two series of disks arranged at an angle to each other. Fig. 2 is an enlarged elevation of my improved harrow disk. Fig. 3 is a vertical transverse sectional view taken on the line 3—3, Fig. 2. Fig. 4 is a perspective view of a portion of my improved harrow disk.

Referring now to the drawings, 1 represents the body portion of my improved disk, which, as shown, is of disk form and provided at its center with a rectangular opening 2, by means of which the same is mounted upon the shaft or bar of a harrow and held against rotation thereon. While I have shown and described a square opening in the disk for holding it upon the shaft, it will be understood that the same could be round and the disk rotate upon the shaft if desired without departing from my invention.

The body 1 of the disk, as heretofore described, is of a saucer shape and is of cast iron, and having its outer edge 3 made heavy and formed with a series of sloping teeth 4, which are arranged in the same arc of a circle as the body 1 of the disk, only sloping or tapering toward the outer ends 5, as clearly shown in Figs. 1 and 2 of the drawings. The teeth 4, as shown, are provided with sharpened steel points 6, which are also in the same arc of a circle as the teeth. These points are wedge-shaped at their outer ends transverse of the disk, as indicated by the reference numeral 7 and have one edge beveled at right angles to the wedge formation, as indicated at 8.

The disk as shown in Fig. 1 of the drawings, in their rotation, have a sidewise cutting action of the ground, the sidewise cut being indicated by dotted lines in Fig. 1 at *c*. This sidewise cutting action of the disk is sufficient to stir the top of the soil and yet not sufficient to destroy the tender grain, but sufficient to pulverize the soil. The outer thickened portion 3 of the disk 1, has secured therein the auxiliary teeth 9, one of said teeth being arranged between two of the cultivating teeth and the auxiliary teeth are of a curved form and extend out the same distance as the cultivating teeth. These teeth, as shown, are wedge-shaped at their outer ends 10 and said wedge is arranged at right angles to that of the teeth 6. The outer ends of said teeth are beveled at 11, which is at right angles to that of the wedge, as clearly shown in Figs. 2 and 3 of the drawings. These auxiliary teeth, as heretofore stated, are curved and their outer wedge-shaped ends are some distance from the teeth 4.

From the foregoing it will be seen that the cultivating teeth being of the form shown, will readily cultivate the small grain without injury to the roots thereof, and at the same time firms the soil, moves the surface sufficiently to break the capillary system. The auxiliary teeth fill the furrows with loose earth making perfect the three operations in one, namely, firming the soil, moving the surface to destroy capillary system and leaving a dust mulch on top of the ground.

Having thus described my invention, what I claim and desire to secure by Letters Patent is:

1. A harrow disk comprising a central saucer-shaped body portion having a central shaft receiving opening, the outer edge of said body-portion having enlarged curved sloping teeth in the same arc of a circle as the body-portion and having wedge-shaped outer ends and beveled on one side transverse of the disk.

2. A harrow disk comprising a body-portion, cultivating teeth carried by the outer edge thereof, and laterally extending teeth carried by the body portion and extending out in a peripheral line with the cultivator teeth.

3. A harrow disk comprising a body-portion, cultivating teeth carried by the outer edge thereof and having reduced pointed ends and laterally extending teeth secured by the body-portion between the cultivator teeth and extending out in a peripheral line therewith.

4. A harrow disk, comprising a dish-shaped body-portion having teeth carried by the outer edge and arranged in the same arc of a circle as the body portion and laterally extending teeth carried by the convex side of the body portion intermediate the cultivator teeth.

5. A harrow disk comprising a central saucer-shaped body portion, having a shaft receiving opening, the outer edge of the body-portion enlarged and terminating in tapering curved cultivator teeth arranged in the same arc of a circle as the body-portion and having wedge-shaped outer ends and beveled on one side transverse of the disk, and laterally extending teeth carried by the body-portion intermediate the cultivator teeth and having wedge-shaped outer ends and beveled on one side parallel the disk.

6. A harrow disk comprising a central saucer-shaped body-portion having a shaft receiving opening, the outer edge of said body-portion being enlarged and terminating in curved teeth arranged in the same arc of a circle as the body-portion and having wedge-shaped outer ends and beveled on one side transverse the disk.

7. A harrow disk comprising a central saucer-shaped body portion having a receiving opening, the outer edge of said body portion being enlarged and terminating in curved tapering teeth arranged in the same arc of a circle as the body portion and having wedge-shaped outer ends beveled on one side transverse the disk, and laterally extending teeth carried by the enlarged outer edge of the body portion and having wedge-shaped outer ends beveled on one side longitudinally of the disk.

In testimony whereof I hereunto affix my signature in the presence of two witnesses.

DAVID W. BOVEE.

Witnesses:
L. F. POTTER,
L. V. MORROW.

---

Copies of this patent may be obtained for five cents each, by addressing the "Commissioner of Patents, Washington, D. C."